United States Patent
Krause et al.

(10) Patent No.: US 7,185,786 B2
(45) Date of Patent: *Mar. 6, 2007

(54) GAS STORAGE AND DELIVERY SYSTEM FOR PRESSURIZED CONTAINERS

(76) Inventors: Arthur A. Krause, 20539 Archwood St., Winnetka, CA (US) 91306; Walter K. Lim, P.O. Box 2409, Rancho Santa Fe, CA (US) 92067-2409

( * ) Notice: Subject to any disclaimer, the term of this patent is extended or adjusted under 35 U.S.C. 154(b) by 0 days.

This patent is subject to a terminal disclaimer.

(21) Appl. No.: 10/866,451

(22) Filed: Jun. 12, 2004

(65) Prior Publication Data

US 2005/0274737 A1   Dec. 15, 2005

(51) Int. Cl.
  *B65D 83/62* (2006.01)
  *B65D 83/64* (2006.01)
(52) U.S. Cl. ............. 222/1; 222/386; 222/386.5; 222/394; 222/402.1
(58) Field of Classification Search ............ 222/105, 222/94, 130, 402.1–402.25, 386, 389, 1, 222/3, 386.5, 394
See application file for complete search history.

(56) References Cited

U.S. PATENT DOCUMENTS

| | | | |
|---|---|---|---|
| 1,608,155 A | | 11/1926 | Barnebey |
| 3,122,284 A | | 2/1964 | Miles |
| 3,659,395 A | | 5/1972 | Morane et al. |
| 3,858,764 A | | 1/1975 | Watson |
| 4,049,158 A | | 9/1977 | Lo et al. |
| 4,182,688 A | | 1/1980 | Murtaugh |
| 4,518,103 A | * | 5/1985 | Lim et al. .......... 222/135 |
| 5,032,619 A | * | 7/1991 | Frutin et al. ......... 521/55 |
| 5,054,651 A | | 10/1991 | Morane |
| 5,234,140 A | | 8/1993 | Demarest et al. |
| 5,256,400 A | | 10/1993 | Froix et al. |
| 5,301,851 A | * | 4/1994 | Frutin .............. 222/389 |
| 5,562,235 A | * | 10/1996 | Cruysberghs ........ 222/396 |
| 6,360,923 B1 | | 3/2002 | Vlooswijk |
| 6,527,150 B2 | * | 3/2003 | Benoist ............ 222/402.1 |
| 6,708,844 B2 | * | 3/2004 | Lim et al. ............ 222/3 |
| 6,745,922 B1 | | 6/2004 | Vlooswijk et al. |
| 6,770,118 B2 | | 8/2004 | Stilyarevsky |
| 2006/0049215 A1 | * | 3/2006 | Lim et al. ........... 222/402.1 |

* cited by examiner

*Primary Examiner*—Joseph A. Kaufman
(74) *Attorney, Agent, or Firm*—Dennis H. Lambert

(57) ABSTRACT

A gas adsorption material containing a desired quantity of gas is placed in a pressurized container along with a product to be dispensed, and as pressure in the container is depleted during use, stored gas is released into the container to maintain pressure in the container within a predetermined range. The material may be in contact with the product, or it may be isolated from the product, and is known as a pressure swing adsorption (PSA) system, wherein adsorption of gas into the material occurs at a high pressure, and desorption of gas from the material occurs at a low pressure. Such devices are capable of storing under pressure a volume of gas 18 to 20 times the volume of the material. A preferred adsorbent gas storage material is granular activated carbon, or a carbon fiber composite molecular sieve (CFCMS). Other materials, such as zeolite, starch-based polymers, activated alumina, silica gel, and sodium bicarbonate, or mixtures thereof, may be used, although they generally are not as effective as activated carbon. The adsorbent material may be in granular, powdered, or pellet form, or a mass of the material may be formed into variously shaped cohesive bodies, such as balls, tubes, cubes or rods, or sheets or screens which may be flat or curved or folded into various shapes, such as, for example, an accordion-like fold.

16 Claims, 3 Drawing Sheets

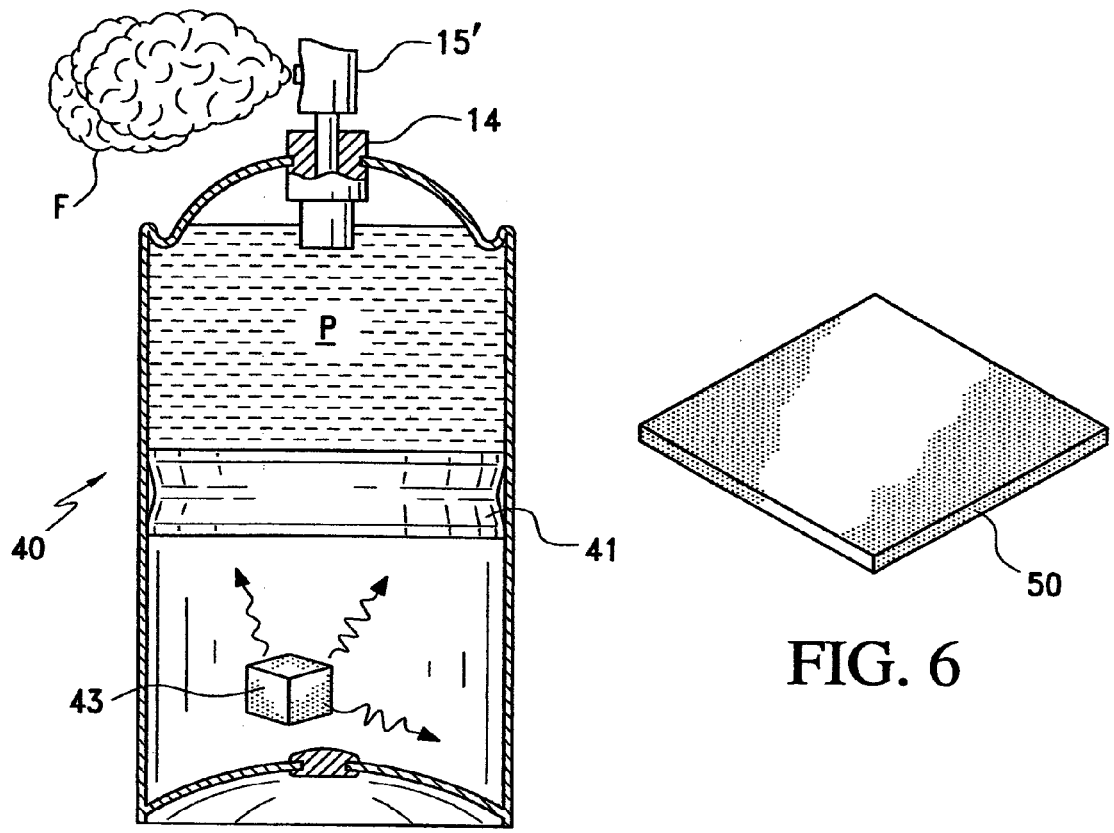
FIG. 5
FIG. 6
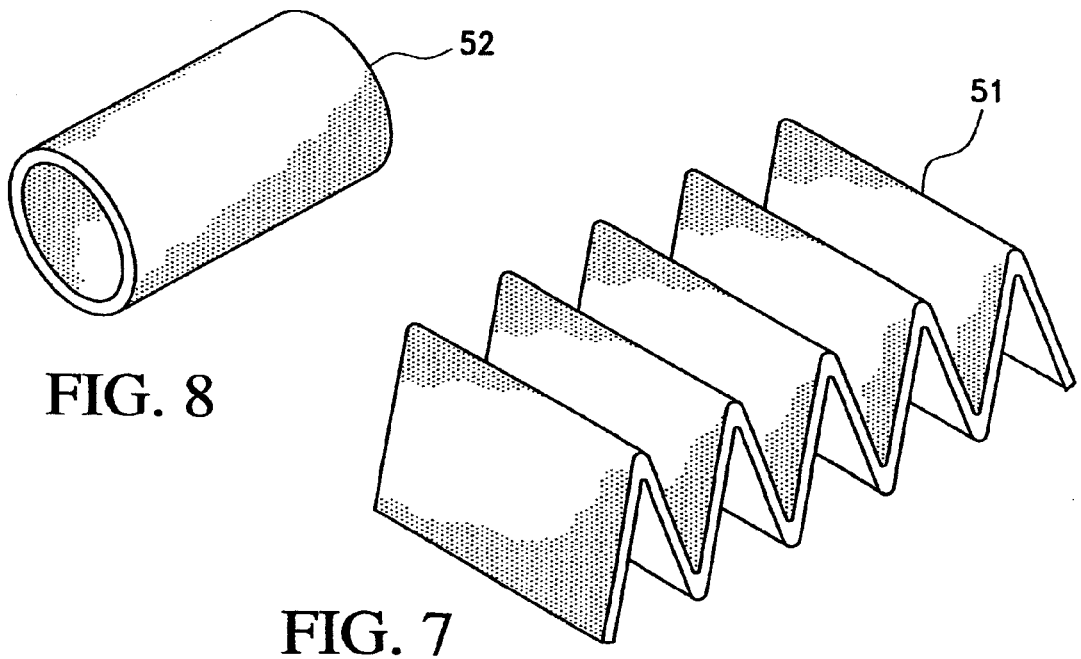
FIG. 8
FIG. 7

GAS STORAGE AND DELIVERY SYSTEM FOR PRESSURIZED CONTAINERS

BACKGROUND OF THE INVENTION

1. Field of the Invention

This invention relates generally to pressurized containers, and more particularly, to a gas storage and delivery system for restoring and maintaining pressure as it is depleted from pressurized containers such as aerosol dispensers, bottles of carbonated beverage, fire extinguishers using water or foam, and the like.

2. Prior Art

Pressurized containers are commonly used to dispense many products, including paint, lubricants, cleaning products, hair spray, and food items. These containers are typically aerosol dispensers in which the product is stored under pressure with a suitable propellant. Dispensing of the product occurs when a discharge nozzle is depressed, permitting the pressurized product to be forced out through the nozzle, usually as a spray, stream or foam. As product is depleted from the container, the pressure exerted by the propellant decreases, especially evident with compressed gases, and may become diminished to the extent that all of the product cannot be dispensed from the container, or desired characteristics are not achieved.

Many products, e.g., hair spray, require a carrier in addition to the propellant component, e.g., alcohol, that dries quickly upon discharge from the container. Volatile organic compounds (VOCs) such as propane, isobutane, dimethyl ether, and the like, are suitable as propellants for many products, but their use is limited due to environmental concerns. For instance, under some current regulations no more than 55% of the contents of the container can comprise a VOC. In an aerosol dispenser, as much as 25% of the VOC could be required for use as a propellant, leaving about 30% VOC in the product. This 25% reduction typically is made up with water, which does not dry as quickly as the VOC, resulting in a "wet" product when used.

Carbon dioxide ($CO_2$) is environmentally friendly, and is therefore useful as an aerosol propellant, but its use has been limited due to the drop off in pressure from start to finish as the product is used. For example, in a typical situation the starting pressure might be 100 psig and the finishing pressure only 30 psig. At this low finishing pressure all of the product may not be discharged, and/or proper aerosolization may not be obtained.

Carbonated beverages are also bottled under pressure, usually by a pressurized inert gas, such as $CO_2$, placed in the bottle along with the beverage. Over time, the pressure of the gas may decrease, resulting in a "flat" drink. This is particularly true when plastic containers are used to bottle carbonated beverages. The shelf life of such products may be undesirably short.

Further, cans of pressurized gas are provided for cleaning dust and the like from sensitive equipment, such as computers, computer keyboards, etc., by blowing a pressurized stream of propellant onto the equipment. Currently available products for this purpose use a VOC (e.g., Dymel® by DuPont) as the propellant. These materials are relatively expensive for the intended use.

Accordingly, there is a need for a system to replenish and maintain a desired pressure in pressurized containers, such as aerosol dispensers and carbonated beverages, and particularly to such a system that is inexpensive and environmentally friendly.

SUMMARY OF THE INVENTION

The present invention provides a system and method to replenish and maintain a desired pressure in pressurized containers, such as aerosol dispensers and carbonated beverages, and represents further improvements over the invention disclosed in applicant's prior U.S. Pat. No. 6,708,844, issued May 23, 2004.

In accordance with the invention, a gas adsorption and storage material containing a desired quantity of gas is placed in a pressurized container along with a product to be dispensed, and as pressure in the container is depleted during use, a quantity of the stored gas is released into the container to maintain pressure in the container within a predetermined range. For example, a quantity of gaseous material under pressure in the container may apply to the product a predetermined pressure of from about 30 to about 180 psi, and as this pressure falls off during use of the container, additional gaseous material is released into the container from the gas adsorption and storage material to restore the pressure to the desired range.

The gas adsorption material may be placed directly in contact with the product being dispensed, or it may be isolated from direct contact with the product. In some applications, for example, the pressurized container may comprise a bag-in-a-can, wherein the product to be dispensed is held in a bag supported in the container, and pressurized gas surrounds the bag. In other applications, a piston may separate the product being dispensed from the pressurized gas. In these containers the gas adsorption material could be placed in the container on the outside of the bag, or beneath the piston. In containers wherein the product and pressurized gas are mixed and dispensed through a dip tube, the adsorbent material can be isolated from direct contact with the product by use of a membrane that permits gas to flow from the adsorbent material to the product, but prevents reverse flow of product to the adsorbent material. Whether the gas adsorption material is placed in direct contact with the product being dispensed, or isolated from it depends upon various factors, including the nature of the product being dispensed, and the nature of the spray or foam or other characteristic that is desired for the discharged product. For instance, inclusion of some of the gas, e.g., $CO_2$, in the product may be desirable to enhance atomization or foaming of the product as it is dispensed. In that embodiment employing a bag in a can, for example, a small amount of the gas may be soulubolized in the product before the product is placed in the bag, or a small amount of the gas may be charged into the product after it is placed in the bag. Inclusion of some of the propellant gas in the product would be beneficial with hair sprays, for example.

The adsorbent gas storage material used in the invention is known as a pressure swing adsorption (PSA) system, wherein adsorption of gas into the material occurs at a high pressure, and desorption of gas from the material occurs at a low pressure. Such adsorption/desorption devices are capable of storing under pressure a volume of gas that is 18 to 20 times the volume of the material.

A preferred adsorbent gas storage material is granular activated carbon, or a carbon fiber composite molecular sieve (CFCMS) as disclosed in U.S. Pat. Nos. 5,912,424 and 6,030,698, which are incorporated in full herein. Other materials, such as natural or synthetic zeolite, starch-based polymers, alumina—preferably activated alumina, silica gel, and sodium bicarbonate, or mixtures thereof, may be used to adsorb and store a quantity of a desired gas, although they generally are not as effective as activated carbon.

The adsorbent material may be in granular, powdered, or pellet form, or a mass of the material may be formed into variously shaped cohesive bodies, such as balls, tubes, cubes or rods, or sheets or screens which may be flat or curved or folded into various shapes, such as, for example, an accordion-like fold. One suitable source of granular activated carbon, for example, is a 10×50 mesh material available from Westvaco Corporation under number 1072-R-99. The material may be surrounded with a suitable cover or membrane to isolate it from direct contact with the product.

The cover may be something that functions only to contain the carbon and prevent its admixture and discharge with the product, or it may be a gas permeable membrane that is capable of passing the desired gas but prevents contact between the carbon and the liquid or other product in the container. One suitable cover may comprise a Tetratex® 1316 membrane film, for example, available from Tetratec PTFE Technologies. Such membranes are employed in reverse osmosis water purification systems, for example.

The adsorbent material may be pre-charged with the desired gas and then placed in a previously pressurized container, or in communication with the interior of the container, or it may be placed in a non-pressurized container and a desired gas then introduced under pressure into the container after it is sealed to charge the adsorbent material for subsequent release of the gas as the propellant or carbonization gas becomes depleted during use, thereby restoring the pressure in the container to a desired level. For instance, during filling of an aerosol container, the adsorbent material may be placed in the container and a suitable propellant gas introduced into the container to a pressure of 150 psig, for example, whereupon the adsorbent material will adsorb 75 psig, for example. Product may then be introduced into the container, increasing the pressure back up to 80 to 100 psig, for example. As product is expelled during use and the pressure is depleted, gas is released from the adsorbent material to restore the pressure in the container to a desired predetermined level.

For some applications, nitrous oxide may be used in lieu of or in combination with carbon dioxide. Nitrous oxide is more compatible with products having an oil component, for example.

Any desired suitable quantity of the adsorbent material may be placed in a container to store and release an appropriate amount of gas to maintain pressure in the container at a desired level during use of the system. Depending upon the starting and ending pressure desired in the container, a quantity of the material equal to 5% to 100% of the quantity of product could be placed in the container. A uniform and steady discharge pressure could be obtained, for example, by placing in the container a quantity of gas adsorption material equivalent to from 10% to 60% of the total volume of the container. In a particular example, satisfactory results are obtained when approximately one-half ounce of gas adsorption material charged with a suitable gas is placed in a six-ounce container.

The gas storage and release system of the invention may also be used to discharge oxygen or another gas into a beverage, such as bottled water or a sports drink, if desired.

The use of activated carbon to adsorb additional gas in an aerosol container can increase the available gas to a level which results in the pressure remaining more uniform until the product is depleted. This, in turn, maintains a more consistent, uniform and acceptable spray pattern from beginning to end because the pressure at the end is very close to the starting pressure. In some applications, release of make-up gas pressure into the product may be desirable in order to better aerosolize the product throughout the life cycle of the container, or to achieve better foaming, etc.

The adsorbed gas can comprise carbon dioxide alone or in combination with other gases, such as nitrous oxide, or nitrous oxide can be used alone or in combination with other gases, and/or any one or all of these can be used in combination with liquified compressed gases such as propane, isobutane, dimethyl ether or Dymel® (trademark of DuPont), to produce desired spray patterns which would permit reduction in the quantity of volatile organic compounds used in the pressurized product.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein:

FIG. 5 is a view similar to FIG. 4, but showing a container of the type employing a piston, and wherein the gas storage and release material is in the form of a cube.

FIG. 6 is a top perspective view of a body of the gas storage and release material in the shape of a flat sheet.

FIG. 7 is a top perspective view of a body of the gas storage and release material in the shape of an accordion-pleated sheet.

FIG. 8 is a top perspective view of a body of the gas storage and release material in the shape of a hollow cylinder or tube.

DETAILED DESCRIPTION OF THE PREFERRED EMBODIMENTS

Figure 1:
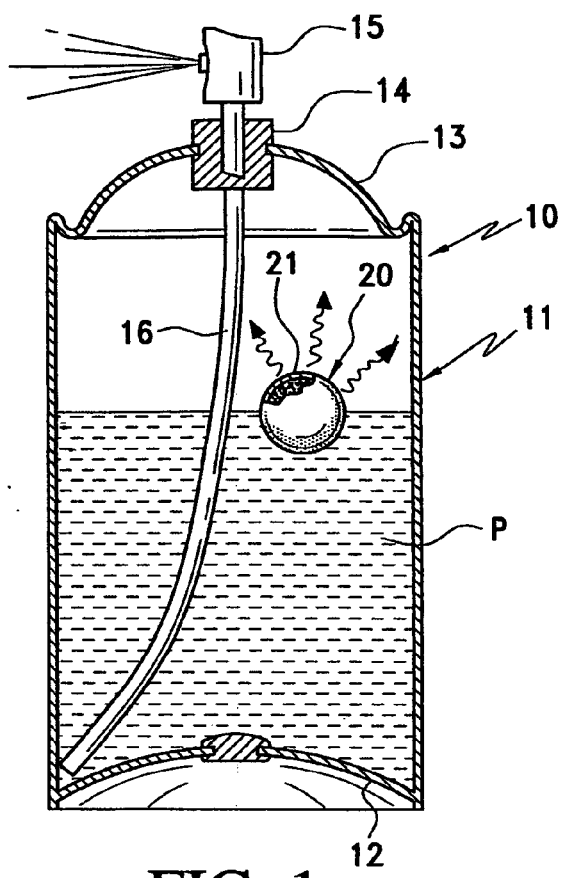
FIG. 1 is a somewhat schematic longitudinal sectional view of a first form of pressurized aerosol dispenser, wherein the dispenser is of the type employing a dip tube, and the gas storage and release material is in the form of a spherically shaped cohesive body or ball.

A first form of aerosol dispenser is indicated generally at 10 in FIG. 1. The dispenser includes a container 11 made of metal or other suitable material, having a bottom 12 and a top 13. A discharge nozzle assembly 14 is mounted on the top and includes a nozzle 15 that may be manually depressed to open and permit product P to be dispensed from the container through the nozzle. A dip tube 16 extends from the bottom of the container to the discharge nozzle assembly. As seen in this figure, the level of product in the container does not occupy the entire volume of the container, and the space above the product level is filled with a pressurized propellant gas to exert pressure on the product and force it through the dip tube and nozzle when the nozzle is depressed. The foregoing structure and operation are conventional.

In accordance with the invention, a storage body 20 of a gas-adsorbing material is placed in the container with the product to adsorb and store a quantity of a desired gas, such as carbon dioxide or nitrous oxide, for example, and to release the stored gas into the container to restore and maintain a desired pressure in the container as the product and/or propellant are depleted. The gas adsorbing material preferably comprises a granular activated carbon, or a carbon fiber composite molecular sieve (CFCMS) as disclosed in U.S. Pat. Nos. 5,912,424 and 6,030,698, which are incorporated in full herein. Other materials, such as natural or synthetic zeolite, starch-based polymers, activated alumina, silica gel, and sodium bicarbonate, or mixtures thereof, may be used to adsorb and store a quantity of a desired gas, although they generally are not as effective as activated carbon. The material is capable of storing, under pressure, a volume of gas that is many times greater than the volume of the material. For instance, the CFCMS material can hold 18 to 20 times the volume of the body. As disclosed herein, the storage body is known as a pressure swing adsorption (PSA) system, wherein adsorption of gas into the body occurs at a high pressure, and desorption of gas from the body occurs at a low pressure. Thus, as the pressure of the propellant gas in the container falls below a predetermined threshold value, gas is released from the body, restoring the pressure in the container.

Figure 2:
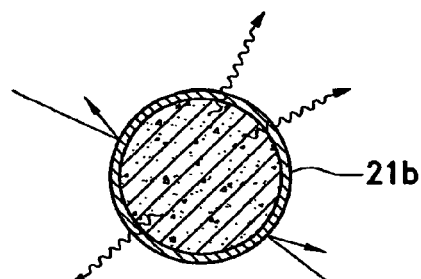
FIG. 2 is an enlarged transverse sectional view of the spherical body of gas-adsorbing material of FIG. 1, showing the material enclosed in a gas permeable membrane.

The body 20 may be formed as a cohesive block of granular activated carbon or carbon fiber composite molecular sieve (CFCMS) material, and may be spherically shaped as shown in the embodiment of FIGS. 1 and 2. The body 20 is placed in the container in contact with the product. Gas, such as carbon dioxide, is stored in the carbon material and released to restore pressure in the container as product is dispensed and the pressure in the container drops below a predetermined threshold level.

Figure 3:
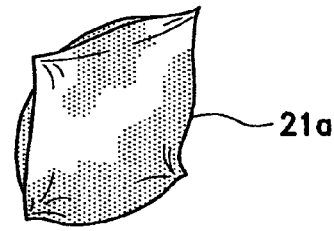
FIG. 3 is a perspective view of a body of gas-adsorbing material enclosed in a porous film or cover.

As seen best in FIGS. 2 and 3, a film or cover 21 may be placed around the body of carbon material to prevent dispersion of the carbon into the product, and/or to prevent direct contact between the carbon and product. That is, the film may comprise a porous member 21a (see FIG. 3) that simply contains the carbon material and permits free flow of gas and product, or it may comprise a membrane or film 21b (see FIG. 2) that permits flow of gas, e.g., carbon dioxide, outwardly through the film into the product, but prevents flow of product into the material. For example, the film 21b may comprise a reverse osmosis membrane placed around the body of material to permit flow of gas from the body into the product, but to prevent flow of product through the membrane to the body.

Figure 4:
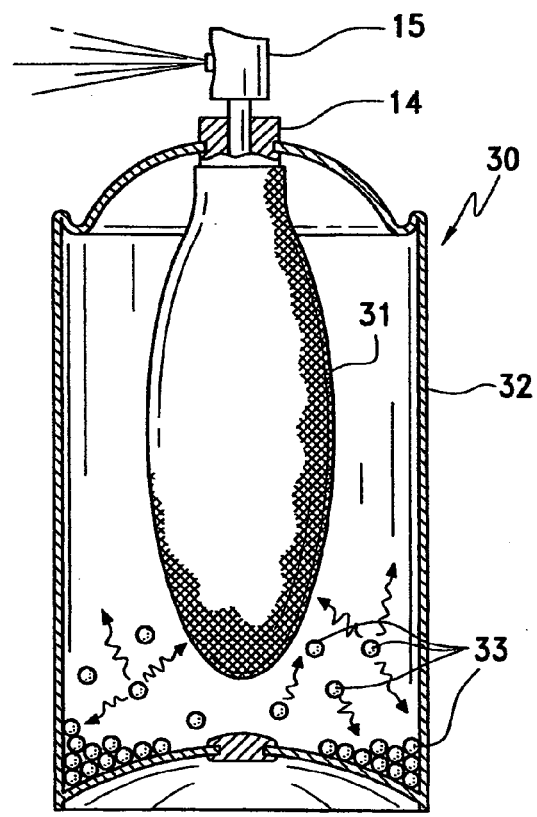
FIG. 4 is a view similar to FIG. 1, but showing a dispenser of the type in which the product to be dispensed is held in a bag in the container, and a granular or pelletized gas storage and release material is employed.

FIG. 4 depicts a pressurized dispenser 30 of the bag-in-a-can type, wherein the product is encased in a bag 31 in the container 32. A gas adsorbing material according to the invention is placed in the container outside the bag, and although the gas adsorbing material may be in any form or shape, as shown in this figure it is in the form of granules or pellets 33. As product is depleted from the bag, the remaining volume of the interior of the container becomes larger, resulting in a decrease in pressure in conventional dispensers. However, in the invention gas is released from the gas-adsorbing material when the pressure falls to a threshold level, thereby restoring the pressure in the container to a desired level. The quantity of gas adsorbing material, and thus the volume of stored gas placed in the container can vary depending upon the desired beginning and ending pressure and other desired discharge characteristics.

FIG. 5 depicts a pressurized dispenser 40 of the type employing a piston 41 between the product P in the upper part of the container and the propellant beneath the piston in the lower part of the container. A gas adsorbing material according to the invention is placed in the container below the piston, and although the gas adsorbing material may be in any form or shape, as shown in this figure it is in the form of a cube 43. Further, this figure shows the product being dispensed as a foam F rather than a spray, and a suitable conventional nozzle 15' is selected for that purpose.

Several examples of the variations in shape that the body of gas adsorbing material can take are shown in FIGS. 6–8. In FIG. 6, the body is in the form of a flat sheet 50; in FIG. 7 the body is in the form of an accordion-folded sheet 51; and in FIG. 8 the body is in the form of a hollow tube or cylinder 52.

Figure 9:
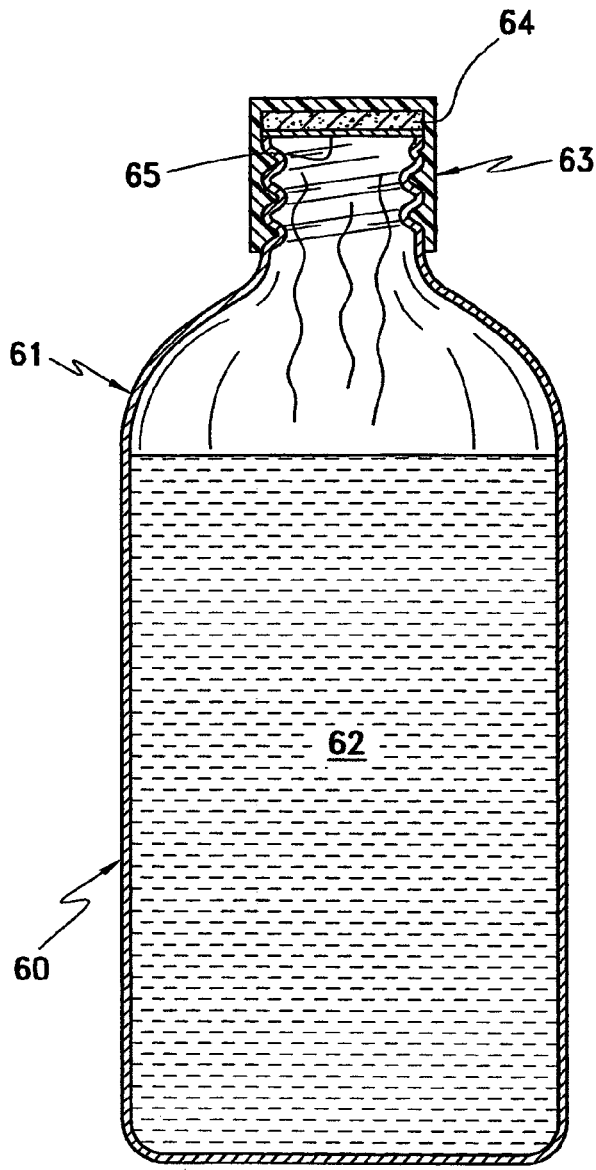
FIG. 9 is a somewhat schematic longitudinal sectional view of a beverage bottle containing a beverage, and having a gas storage and release system according to the invention incorporated into the cap.
Figure 10:
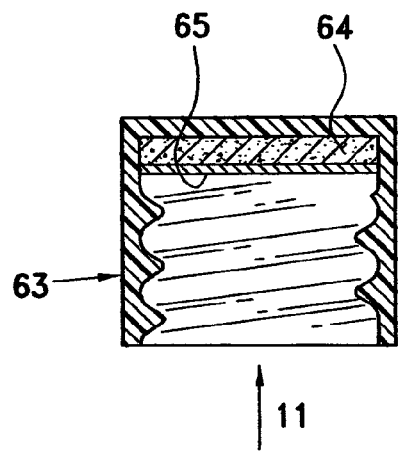
FIG. 10 is an enlarged longitudinal sectional view of a bottle cap incorporating the gas storage and release system of the invention.
Figure 11:
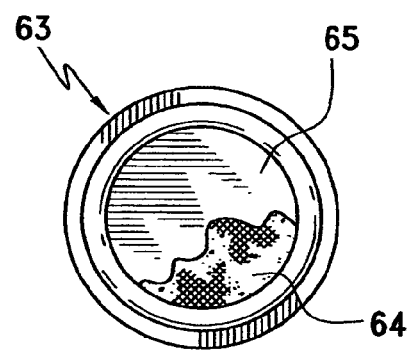
FIG. 11 is an end view of the cap of FIG. 10, looking in the direction of the arrow 11, with portions broken away for sake of illustration.

Use of the invention to store and release gas into a beverage is shown generally at 60 in FIGS. 9–11. In this embodiment, a beverage bottle 61 has a quantity of beverage 62 therein, and a closure cap 63 placed on the end of the bottle.

In accordance with the invention, a storage body 64 of a gas adsorbing material such as activated carbon, or carbon fiber composite molecular sieve (CFCMS) material, or zeolite, or the like, is placed in the cap. If desired, the body may be isolated from the interior of the bottle by a suitable film or cover, such as reverse osmosis membrane 65.

If the beverage is a carbonated beverage, the body may store a quantity of $CO_2$, which is released from the body into the container to restore pressure in the container, and $CO_2$ into the beverage, lost due to depletion of the beverage and the $CO_2$, or permeation of the $CO_2$ through the container wall.

The beverage may also comprise water, or a sports drink, and the gas can comprise $O_2$, to give a boost of energy to a person drinking from the bottle.

While particular embodiments of the invention have been illustrated and described in detail herein, it should be understood that various changes and modifications may be made to the invention without departing from the spirit and intent of the invention as defined by the scope of the appended claims.

What is claimed is:

1. A gas storage and delivery system for restoring pressure as it is depleted from a pressurized container, comprising:
   a container holding a product under pressure to be dispensed from the container;
   a quantity of gaseous material under pressure in the container, occupying a space in the container and applying to the product a predetermined pressure of from about 30 to about 180 psig; and
   a quantity of gas-adsorbing material in the container, on which is adsorbed a quantity of the gaseous material, and from which the gaseous material is desorbed and released into the container in response to a decrease in pressure in the container, thereby restoring and maintaining a predetermined pressure in the container as product is depleted from the container, wherein said gas-adsorbing material is selected from the group consisting of activated carbon, activated alumina, a carbon fiber composite molecular sieve, natural zeolite, and synthetic zeolite, and is contained within a cover that is porous to both the gaseous material and the product.

2. A gas storage and delivery system as claimed in claim 1, wherein:
the gaseous material is selected from the group consisting of carbon dioxide and nitrous oxide.

3. A gas storage and delivery system as claimed in claim 1, wherein:
the gas adsorbing material is a granular or powdered material.

4. A gas storage and delivery system as claimed in claim 1, wherein:
a normally closed discharge nozzle is on the container for releasing the product when the discharge nozzle is moved to an open position;
the product, gas-adsorbing material, and gaseous material are together in the container, with said space comprising a head space above the product; and
a dip tube extends from the discharge nozzle into the product.

5. A gas storage and delivery system as claimed in claim 1, wherein:
the product is contained in a bag in the container; and
the gas-adsorbing material and gaseous material are outside the bag.

6. A gas storage and delivery system as claimed in claim 1, wherein:
a piston divides the container into an upper portion and a lower portion; and
the product is in the upper portion and the gaseous material and gas-adsorbing material are in the lower portion.

7. A gas storage and delivery system for restoring pressure as it is depleted from a pressurized container, comprising:
a container holding a product under pressure to be dispensed from the container;
a quantity of gaseous material under pressure in the container, occupying a space in the container and applying to the product a predetermined pressure of from about 30 to about 180 psig; and
a quantity of gas-adsorbing material in the container with the product, storing under pressure a quantity of the gaseous material and releasing it into the container in response to a decrease in pressure in the container, thereby restoring and maintaining a predetermined pressure in the container as product is depleted from the container, wherein said gas-adsorbing material is selected from the group consisting of carbon, activated carbon, zeolite, and a carbon fiber composite molecular sieve, and is in the form of a cohesive shaped body of material that retains its shape in the container.

8. A gas storage and delivery system as claimed in claim 7, wherein:
said body is in the shape of a flat sheet.

9. A gas storage and delivery system as claimed in claim 7, wherein:
said body is in the shape of a hollow tube or cylinder.

10. A gas storage and delivery system as claimed in claim 7, wherein:
said body is in the shape of a pleated or accordion-folded flat sheet.

11. A gas storage and delivery system as claimed in claim 7, wherein:
said body is in the shape of a sphere.

12. A gas storage and delivery system as claimed in claim 7, wherein:
said body is in the shape of a cube.

13. A process for replenishing pressure depleted from a pressurized container containing a product under pressure and a quantity of gaseous material under pressure for pressurizing the product, comprising the steps of:
placing into the container a quantity of gas-adsorbing material capable of adsorbing and storing a desired volume of the gaseous material under a predetermined pressure and desorbing the gaseous material in response to a decrease in pressure; and
charging a quantity of the gaseous material under pressure into the gas-adsorbing material after the gas adsorbing material is placed in the container, whereby when pressure in the container falls, gaseous material is released from the gas-adsorbing material to restore the pressure in the container.

14. A process as claimed in claim 13, wherein:
an amount of the gaseous material is put in the product to enhance atomization or foaming of the product as it is dispensed.

15. A process as claimed in claim 13, wherein:
said quantity of gas-adsorbing material is formed into a cohesive shaped body prior to placement into the container.

16. A process as claimed in claim 13, wherein:
said quantity of gas-adsorbing material is enclosed in a cover that is permeable to the product and the gaseous material.

* * * * *